(12) United States Patent
Schevers et al.

(10) Patent No.: US 9,957,989 B2
(45) Date of Patent: May 1, 2018

(54) SWIVEL NUT ASSEMBLY

(71) Applicant: THE BOEING COMPANY, Chicago, IL (US)

(72) Inventors: Isaac C. Schevers, St. Louis, MO (US); Ralph D. Czeschin, Washington, MO (US)

(73) Assignee: The Boeing Company, Chicago, IL (US)

( * ) Notice: Subject to any disclaimer, the term of this patent is extended or adjusted under 35 U.S.C. 154(b) by 77 days.

(21) Appl. No.: 15/168,313

(22) Filed: May 31, 2016

(65) Prior Publication Data

US 2017/0343023 A1 Nov. 30, 2017

(51) Int. Cl.
*F16B 5/02* (2006.01)
*F16B 41/00* (2006.01)
*F16B 43/02* (2006.01)

(52) U.S. Cl.
CPC ............ *F16B 5/0208* (2013.01); *F16B 5/025* (2013.01); *F16B 41/002* (2013.01); *F16B 43/02* (2013.01)

(58) Field of Classification Search
CPC ........ F16B 2/16; F16B 5/0208; F16B 21/165; F16B 41/002; F16B 43/02
USPC ...................... 411/298, 348, 537, 551, 941.3
See application file for complete search history.

(56) References Cited

U.S. PATENT DOCUMENTS

| 1,660,960 | A | * | 2/1928 | Greenslade | .............. | B21K 1/46 |
| | | | | | | 148/211 |
| 2,202,472 | A | * | 5/1940 | Tornblom | ............ | B60Q 1/0483 |
| | | | | | | 248/231.61 |
| 2,531,892 | A | * | 11/1950 | Reese | ...................... | F16B 35/06 |
| | | | | | | 403/11 |
| 3,013,244 | A | * | 12/1961 | Rudy | ..................... | H02G 7/125 |
| | | | | | | 174/146 |
| 3,250,559 | A | | 5/1966 | Sommerfeld | | |
| 4,230,336 | A | * | 10/1980 | Avrea | ..................... | B60D 1/065 |
| | | | | | | 280/507 |
| 5,280,941 | A | * | 1/1994 | Guhlin | ..................... | B60D 1/60 |
| | | | | | | 280/507 |

(Continued)

FOREIGN PATENT DOCUMENTS

DE 20315778 12/2003
FR 2959284 10/2011

(Continued)

OTHER PUBLICATIONS

Extended European Search Report for EP 17172716.7-1754, dated Oct. 27, 2017.

*Primary Examiner* — Roberta S Delisle
(74) *Attorney, Agent, or Firm* — Joseph M. Butscher; The Small Patent Law Group, LLC (57) ABSTRACT

A swivel nut assembly is configured to adaptively secure a first component to a second component. The swivel nut assembly includes a socket nut including a first portion having a first internal threading, and a second portion defining a swivel chamber. A swivel connector includes a ball having a first external threading. The swivel connector is moved into the swivel chamber via the first external threading threadably engaging the first internal threading to move the ball into the swivel chamber. The ball is rotationally captured within the swivel chamber after the ball is moved into the swivel chamber.

20 Claims, 4 Drawing Sheets

(56) References Cited

U.S. PATENT DOCUMENTS

| | | | | |
|---|---|---|---|---|
| 5,498,092 | A * | 3/1996 | Fellows | F16C 11/0666 |
| | | | | 277/635 |
| 5,511,814 | A * | 4/1996 | Floyd | B60D 1/065 |
| | | | | 280/507 |
| 6,076,840 | A * | 6/2000 | Kincaid | F16F 1/3842 |
| | | | | 267/188 |
| 6,419,279 | B1 * | 7/2002 | Latham | F16L 23/036 |
| | | | | 285/261 |
| 6,692,176 | B1 * | 2/2004 | Fladhammer | B60Q 1/06 |
| | | | | 403/122 |
| 7,731,467 | B2 * | 6/2010 | Babej | F16B 19/08 |
| | | | | 411/183 |
| 2004/0087951 | A1 | 5/2004 | Khalili | |
| 2006/0084980 | A1 * | 4/2006 | Melkent | A61B 17/007 |
| | | | | 606/281 |
| 2011/0097177 | A1 * | 4/2011 | Carnevali | B62J 11/00 |
| | | | | 411/372.5 |
| 2014/0096363 | A1 | 4/2014 | Khamithar | |

FOREIGN PATENT DOCUMENTS

| | | |
|---|---|---|
| GB | 440670 | 1/1936 |
| WO | WO 98/06917 | 2/1998 |

\* cited by examiner

SWIVEL NUT ASSEMBLY

FIELD OF THE DISCLOSURE

Embodiments of the present disclosure generally relate to a swivel nut assembly, and more particularly, to a swivel nut system, method, and assembly that are configured to secure separate and distinct components together.

BACKGROUND OF THE DISCLOSURE

During a manufacturing process of various structures, devices, systems, and the like, two separate and distinct components are secured together by one or more fasteners. The components may not have similar sizes or shapes. As an example, one of the components may be a flat planar piece, while the other component may be curved. In order to secure the two components together, a two piece washer assembly may be used. The washer assembly includes a first loose washer that receives a second loose washer. The two loose washers are configured to move through a limited range of motion in order to accommodate the angular differences between the two components.

In order to securely connect the two components together, an individual manipulates the washer assembly on one side of a first component, and a fastener on another side of the component. However, the washer assembly is susceptible to separating before receiving the fastener.

As can be appreciated, during the manufacture of a large system, such as an aircraft, the separate and distinct washers may be lost. For example, a flat drill plate may be secured to a portion of a curved fuselage panel. A first individual may be positioned on one side of the fuselage panel to secure the washer assembly, while a second individual may be positioned on an opposite side of the fuselage with a fastener. For large structures such as aircrafts, two individuals often work together to secure components (such as a drill plate and fuselage panel) together, through the use of the two piece washer assembly and a fastener. However, the unconnected loose washers may separate and fall into inaccessible areas of the fuselage. As can be appreciated, the manufacturing process may be labor and time intensive, and may be susceptible to loose parts being lost, or misplaced, such as within the system being manufactured.

SUMMARY OF THE DISCLOSURE

A need exists for a system, method, and assembly of efficiently securing two components having different shapes together. A need exists for a system, method, and assembly of preventing, minimizing, or reducing the possibility of loose parts being lost within a system that is being manufactured.

With those needs in mind, certain embodiments of the present disclosure provide a swivel nut assembly that is configured to adaptively secure a first component to a second component. The swivel nut assembly includes a socket nut including a first portion having a first internal threading, and a second portion defining a swivel chamber, which may be defined by a smooth, semi-spherical interior surface. A swivel connector includes a ball having a first external threading. The swivel connector is moved into the swivel chamber via the first external threading threadably engaging the first internal threading to move the ball into the swivel chamber. The ball is rotationally captured within the swivel chamber after the ball is moved into the swivel chamber.

In at least one embodiment, the first portion includes an annular collar, and the second portion includes a retaining sleeve. The retaining sleeve may include an opening at a terminal end. The opening has a first diameter. The ball has a second diameter. The first diameter is less than the second diameter. In at least one embodiment, the retaining sleeve includes a second external threading that is configured to threadably couple to one or both of the first component or the second component.

The swivel connector may include a flange connected to the ball through a stem. In at least one embodiment, the flange is configured to threadably engage a hand knob.

The swivel connector includes at least one internal wall that defines a central passage. The internal wall is configured to threadably engage a fastener that passes into the central passage.

The swivel connector is prevented from disconnecting from the socket nut until the swivel connector and the socket nut are axially aligned and the swivel connector is rotated relative to the socket nut in a disconnecting direction.

Certain embodiments of the present disclosure provide a component connection system that includes a first component defining a first passage, a second component defining a second passage that connects to the first passage, and a swivel nut assembly that includes a socket nut including a first portion having a first internal threading, and a second portion defining a swivel chamber. The second portion is positioned within the first passage. A swivel connector includes a ball having a first external threading. The swivel connector is moved into the swivel chamber via the first external threading threadably engaging the first internal threading to move the ball into the swivel chamber. The ball is rotationally captured within the swivel chamber after the ball is moved into the swivel chamber.

In at least one embodiment, the first passage is angled with respect to the second passage. As such, the first passage may not be coaxial with the second passage.

Certain embodiments of the present disclosure provide a method of adaptively securing a first component to a second component. The method includes moving a ball of a swivel connector into a swivel chamber of a socket nut. The moving includes threadably engaging a first external threading of the swivel connector with a first internal threading of the socket nut. The method also includes rotationally capturing the ball within the swivel chamber after the ball is moved into the swivel chamber.

The method may include threadably engaging a fastener with an internal wall of the swivel connector. The method may include preventing the swivel connector from disconnecting from the socket nut until the swivel connector and the socket nut are axially aligned and the swivel connector is rotated relative to the socket nut in a disconnecting direction.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide a swivel nut assembly that includes a socket nut that receives and retains a swivel connector. The socket nut includes a threaded inner channel that threadably receives a threaded outer portion of the swivel connector. The swivel connector threadably connects to the socket nut. A semi-spherical housing or ball of the swivel connector is rotatably received within a reciprocal chamber of the swivel connector. As such, the swivel connector is rotatably captured and secured by the socket nut. The swivel nut assembly may be used to account for misalignment and/or angular differences between first and second components that are to be secured together.

The swivel nut assembly is configured to adaptively secure a first component to a second component. Each of the first and second components may include a passage (such as a fastener through-hole, channel, hole, opening, or the like), both of which are configured to connect to one another. The passages may not be coaxially aligned with one another. Instead, one of the passages may be radially shifted with respect to the other. The swivel nut assembly is configured to be positioned within one or both of the passages and engage a fastener (such as a bolt, screw, or the like) and compensate for or otherwise accommodate the angular difference between the passages.

Figure 1:
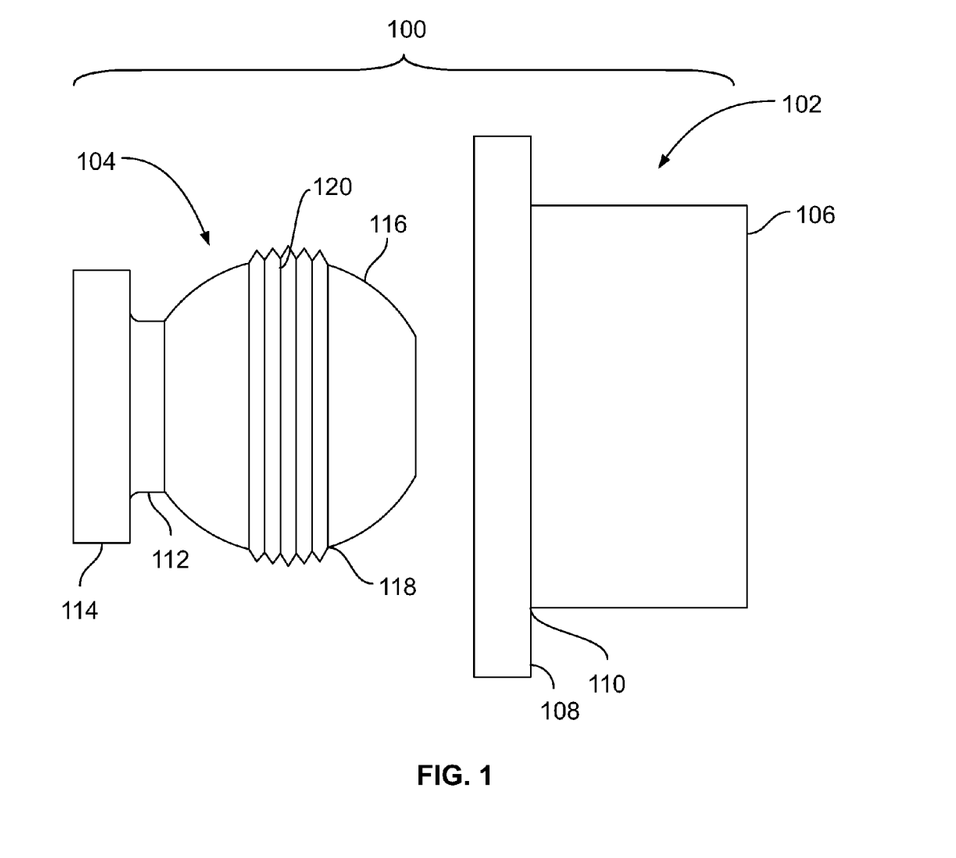
FIG. 1 is a diagrammatic representation of a lateral view of a swivel nut assembly, according to an embodiment of the present disclosure.

FIG. 1 is a diagrammatic representation of a lateral view of a swivel nut assembly 100, according to an embodiment of the present disclosure. The swivel nut assembly 100 includes a socket nut 102 that is configured to receive and rotatably retain a swivel connector 104. The socket nut 102 includes a retaining sleeve 106 and an annular collar 108 radially extending from an outer surface of an end 110 of the retaining sleeve 106.

The swivel connector 104 may include a stem 112 extending from a flange 114. A semi-spherical housing or ball 116 extends from the stem 112 opposite from the flange 114. As shown, at least a portion of an outer surface 118 of the ball 116 includes external threads (or threadings) 120. The external threads outwardly extend from the outer surface 118. The threads 120 are configured to threadably engage interior threads formed within a ball passage (not shown in FIG. 1) within the collar 108.

Figure 2:
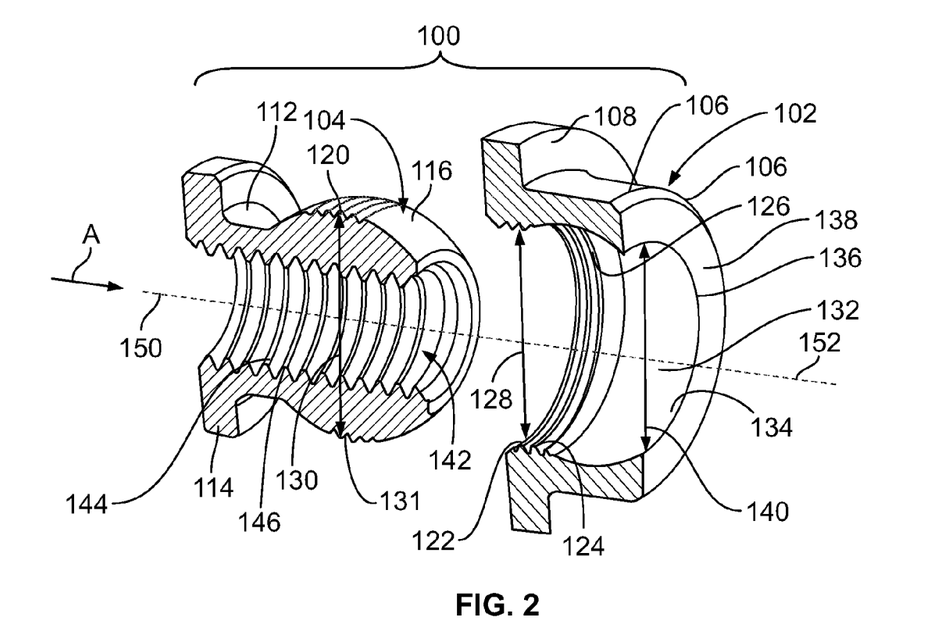
FIG. 2 is a diagrammatic representation of a perspective axial cross-sectional view of a swivel nut assembly in which a socket nut is separated from a swivel connector, according to an embodiment of the present disclosure.

FIG. 2 is a diagrammatic representation of a perspective axial cross-sectional view of the swivel nut assembly 100 in which the socket nut 102 is separated from the swivel connector 104, according to an embodiment of the present disclosure. A ball passage 122 is defined through the collar 108. An interior wall 124 of the collar 108 that defines the ball passage 122 includes internal threads (or threadings) 126. The collar 108 is internally threaded (that is, internal portions of the collar are threaded). The internal threads 126 internally extend from the interior wall 124 into the ball passage 122. The internal threads 126 are configured to threadably engage the external threads 120 of the ball 116 of the swivel connector 104.

An internal diameter 128 of the ball passage 122 is larger than an external diameter 130 of the ball 116 (at an equator 131). The internal diameter 128 and the external diameter 130 are sized to allow the ball 116 to fit within the ball passage 122 and allow the external threads 120 to threadably engage the internal threads 126.

The ball passage 122 of the collar 108 connects to a swivel chamber 132 defined within the retaining sleeve 106. The swivel chamber 132 is defined by a semi-spherical wall 134 that may correspond to the shape of the ball 116 of the swivel connector 104. The surface of the semi-spherical wall 134 may be smooth, in order to allow the ball 116 to freely swivel, rotate, or the like within the swivel chamber 132. For example, the semi-spherical wall 134 provides a smooth, semi-spherical interior surface on which the ball 116 may freely slidably rotate. Alternatively, a portion of the semi-spherical wall 134, such as proximate the collar 108, may also include threads.

The swivel chamber 132 connects to an opening 136 at a terminal end 138 of the sleeve 106. The opening 136 has a diameter 140 that may be less than the diameter 130 of the ball 116 at the equator 131. Accordingly, after the ball 116 is threaded through the collar 108 into the swivel chamber 132, the swivel connector 104 is rotationally captured by the socket nut 102.

The swivel connector 104 includes a central passage 142 that may pass through an entirety of the swivel connector 104. The central passage 142 is defined by internal walls 144 having internal threads 146. The threads 146 are configured to threadably engage external threads of a fastener, such as a screw, bolt, or the like.

In order to rotationally secure the swivel connector 104 to the socket nut 102, a central longitudinal axis 150 of the swivel connector 104 is axially aligned with a central longitudinal axis 152 of the socket nut 102. Once the axes 150 and 152 are axially aligned, the swivel connector 104 is urged into the ball passage 122 of the collar 108 in the direction of arrow A until the internal threads 126 of the collar 108 engage the external threads 120 of the ball 116.

Figure 3:
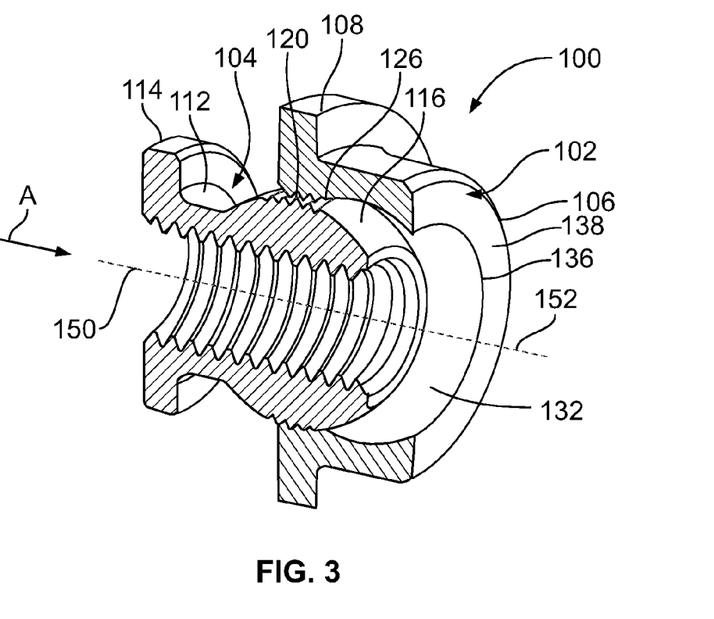
FIG. 3 is a diagrammatic representation of a perspective axial cross-sectional view of a swivel nut assembly in which a socket nut threadably engages a swivel connector, according to an embodiment of the present disclosure.

FIG. 3 is a diagrammatic representation of a perspective axial cross-sectional view of the swivel nut assembly 100 in which the socket nut 102 threadably engages the swivel connector 104, according to an embodiment of the present disclosure. As the internal threads 126 engage the external threads 120, the socket nut 102 is rotated in a securing direction with respect to the swivel connector 104, or vice versa (that is, the socket nut 102 is rotated relative to the swivel connector 104 in a securing direction) about the aligned axes 150 and 152 so that the ball 116 is drawn toward and into the swivel chamber 132 of the socket nut 102. The socket nut 102 continues to be rotated relative to the swivel connector 104 in the securing direction until the external threads 120 of the ball 116 are fully threaded past the internal threads 126 of the collar 108, thereby drawing the ball 116 into the swivel chamber 132, which rotatably retains within the ball 116 without the internal threads 126 threadably engaging the external threads 120. As such, the ball 116 may swivel or otherwise rotate within the swivel chamber 132. In this manner, the swivel connector 104 is rotationally captured by the socket nut 102.

Because the ball 116 is too large to fit through the opening 136, the ball 116 is prevented from passing out of the terminal end 138 of the socket nut 102. After the axes 150 and 152 are coaxially aligned, the socket nut 102 is then rotated relative to the swivel connector 104 about the aligned axes 150 and 152 in a disconnecting direction. Therefore, the socket nut 102 securely and rotatably retains the swivel connector 104 and is not susceptible to being inadvertently disconnected. In order to disconnect the swivel connector 104 from the socket nut 102, the respective axes 150 and 152 are first coaxially aligned (so that the internal threads 126 of the collar 108 are able to threadably engage the external threads 120 of the ball 116), and then the socket nut 102 is rotated about the aligned axes 150 and 152 relative to the swivel connector 104 in a disconnecting direction until the swivel connector 104 is threaded out of the socket nut 102.

When the ball 116 of the swivel connector 104 is rotationally captured within the swivel chamber 132 of the socket nut 102, the swivel connector 104 may swivel with respect to the socket nut 102 through a range of radial angles in relation to a center of the swivel chamber 132. The rotational range may be dictated by the length and outer diameter of the stem 112 of the swivel connector 104. For example, as the swivel connector 104 swivels relative to the socket nut 102, the flange 114 may rotate into the collar 108, thereby limiting further swiveling. The shorter the stem 112 is, the less the range of swiveling motion. The stem 112 may be longer than shown to provide a greater range of motion, or the stem 112 may be shorter than shown to provide a lesser range of motion. Alternatively, the swivel connector 104 may not include the flange 114 or the stem 112, thereby allowing for a greater or even unlimited range of swiveling motion.

Figure 4:
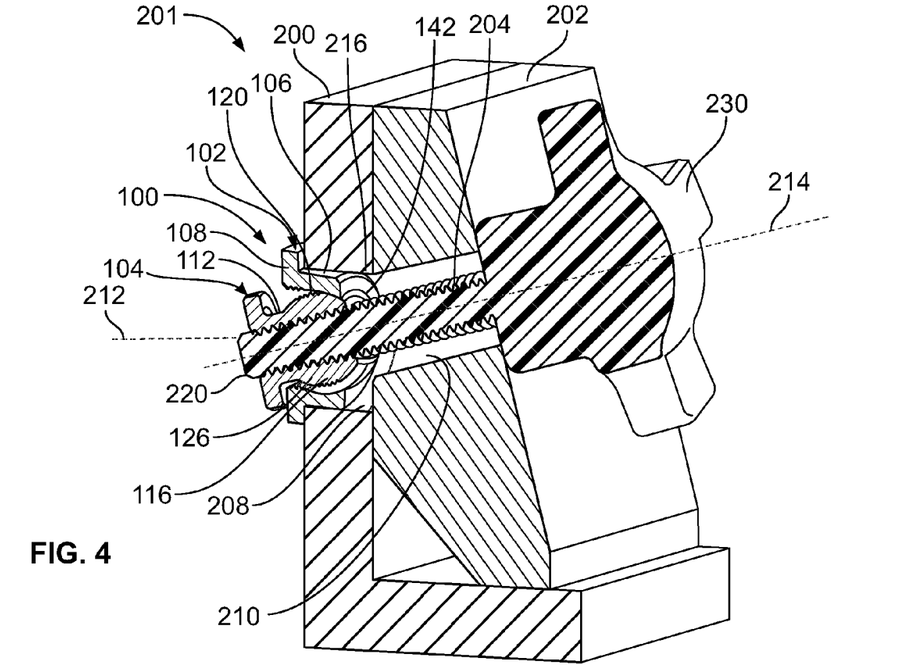
FIG. 4 is a diagrammatic representation of a perspective cross-sectional view of first and second components secured together through a swivel nut assembly and a fastener, according to an embodiment of the present disclosure.

FIG. 4 is a diagrammatic representation of a perspective cross-sectional view of first and second components 200 and 202 secured together through the swivel nut assembly 100 and a fastener 204, according to an embodiment of the present disclosure. The first component 200 may be a fixture (for example, a panel of a fuselage of an aircraft), and the second component 202 may be a part (for example, a drill plate) that is configured to be secured to the first component 200. As shown in FIG. 1, a component connection system 201 includes the first component 200 connected to the second component 202 through the swivel nut assembly 100 and the fastener 204.

The first component 200 includes a passage 208, while the second component 202 includes a passage 210. A central longitudinal axis 212 of the passage 208 is not coaxial with a central longitudinal axis 214 of the passage 210. Accordingly, an angular difference exists between the passages 208 and 210. The swivel nut assembly 100 is used to compensate for the angular difference between the passages 208 and 210.

As shown, the sleeve 106 of the swivel nut assembly 100 is positioned within the passage 208 of the first component 200. An outer surface of the sleeve 106 abuts into an interior edge 216 of the first component 200 that defines the passage 208. For example, the sleeve 106 may be secured into the passage 208 through an interference fit, a press fit, a threadable interface, one or more adhesives, and/or the like. The collar 108 abuts into a surface of the first component 200, but is too wide to fit within the passage 208, thereby ensuring that the securing nut 102 does not pass too far into the passage 208. As described above, the securing nut 102 rotationally captures the swivel connector 104, thereby preventing the swivel connector 104 from inadvertently disconnecting from the securing nut 102 before and after the fastener 204 secures to the swivel connector 104.

After the swivel nut assembly 100 is connected to the first component 200, the fastener 204 is passed into the passage 210. As the distal end 220 of the fastener 204 passes into the central passage 142 of the swivel connector 104 that is exposed through the opening 136 (shown in FIGS. 2 and 3) of the socket nut 102, the ball 116 swivels in response thereto, so that the distal fastener 204 passes into the threaded central passage 142 and threadably secures to the swivel nut assembly 100 with continued threadable engagement, such as may be imparted through a clamp 230 coupled to an opposite end of the fastener 204. Optionally, the fastener 204 may not be coupled to the clamp 230, but may be torqued with respect to the swivel nut assembly 100, such as through a wrench, drill, and/or the like.

As shown in FIG. 4, the swivel nut assembly 100 may be configured to accommodate an angular difference between the passages 208 and 210 of the respective first and second components 200 and 202. In at least one embodiment, the stem 112 may be sized to provide a range of motion between the swivel connector 104 and the socket nut 102 of between −15 degree and 15 degrees. Optionally, the stem 112 may be sized and shaped to provide an angular range of motion that is greater or less than 15 absolute degrees, as noted above.

When the fastener 204 is removed from the first and second components 200 and 202, the swivel connector 104 remains rotationally secured to the swivel nut 102. The ball 116 of the swivel connector 104 remains rotationally captured by the socket nut 102. As such, the swivel connector 104 does not dislodge from the socket nut 102. The swivel nut assembly 100 provides a unitary assembly that reduces the possibility of the swivel connector 104 being misplaced, lost, or the like, in relation to the socket nut 102, or vice versa.

In order to disconnect the swivel connector 104 from the socket nut 102, the swivel connector 104 and the socket nut 102 are first coaxially aligned. After being coaxially aligned, an individual then rotates the socket nut 102 relative to the swivel connector 104 in a disconnecting direction so that the external threads 120 of the ball 116 threadably interface with the internal threads 126 of the collar 108, as described above.

Figure 5:
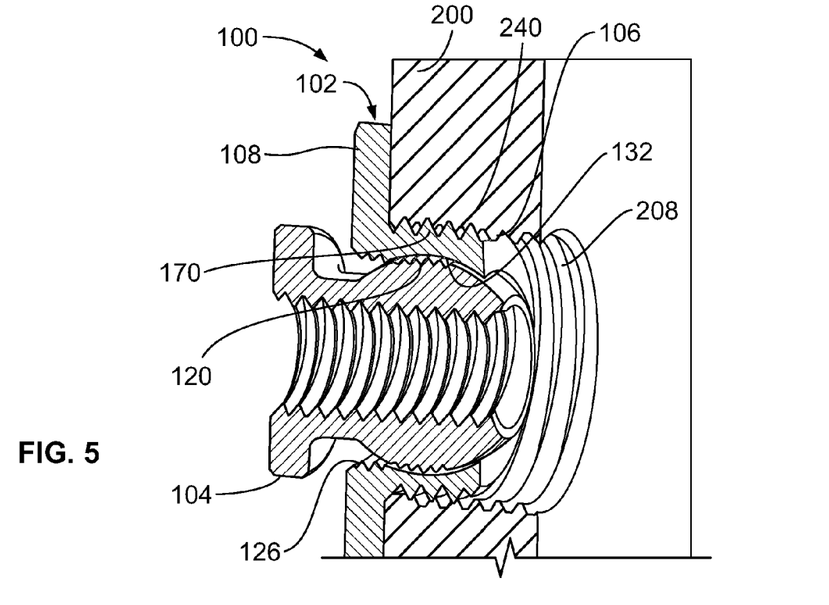
FIG. 5 is a diagrammatic representation of a perspective cross-sectional view of a swivel nut assembly secured to a first component, according to an embodiment of the present disclosure.

FIG. 5 is a diagrammatic representation of a perspective cross-sectional view of the swivel nut assembly 100 secured to the first component 200, according to an embodiment of the present disclosure. As shown, an outer surface of the retaining sleeve 106 may include external threads 170 that threadably engage internal threads 240 of the first component 200 that define the passage 208. In this manner, the swivel nut assembly 100 may be securely retained by the first component 200 even when the fastener 204 (shown in FIG. 4) is not secured to the swivel connector 104.

As shown in FIG. 5, the external threads 120 of the ball 116 are advanced into the swivel chamber 132 past the internal threads 126 of the collar 108. As such, the ball 116 is rotationally captured within the swivel chamber 132.

Figure 6:
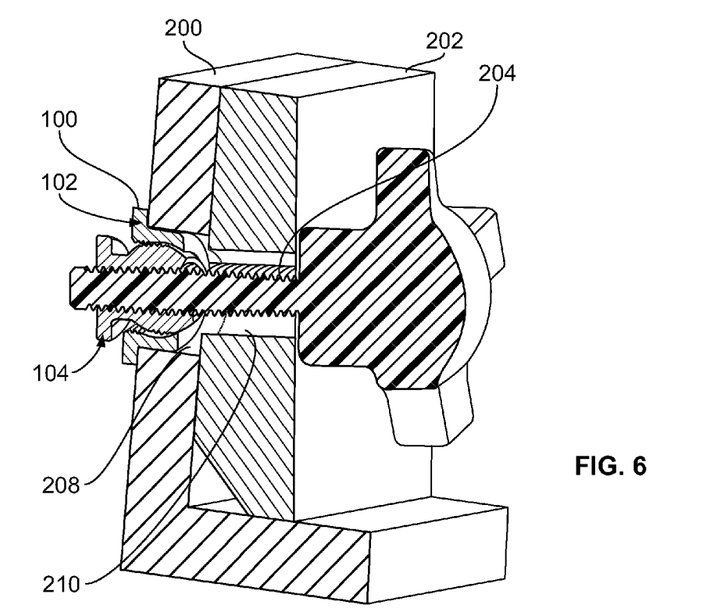
FIG. 6 is a diagrammatic representation of a perspective cross-sectional view of first and second components secured together through a swivel nut assembly and a fastener, according to an embodiment of the present disclosure.

FIG. 6 is a diagrammatic representation of a perspective cross-sectional view of first and second components 200 and 202 secured together through the swivel nut assembly 100 and the fastener 204, according to an embodiment of the present disclosure. The embodiment shown in FIG. 6 is similar to the embodiment shown in FIG. 4, except that the angular difference between the first and second passages 208 and 210 is not as great as shown in FIG. 4. The swivel nut assembly 100 is able to accommodate and compensate for various angular differences between the passages 208 and 210, as shown in FIGS. 4 and 6.

Figure 7:
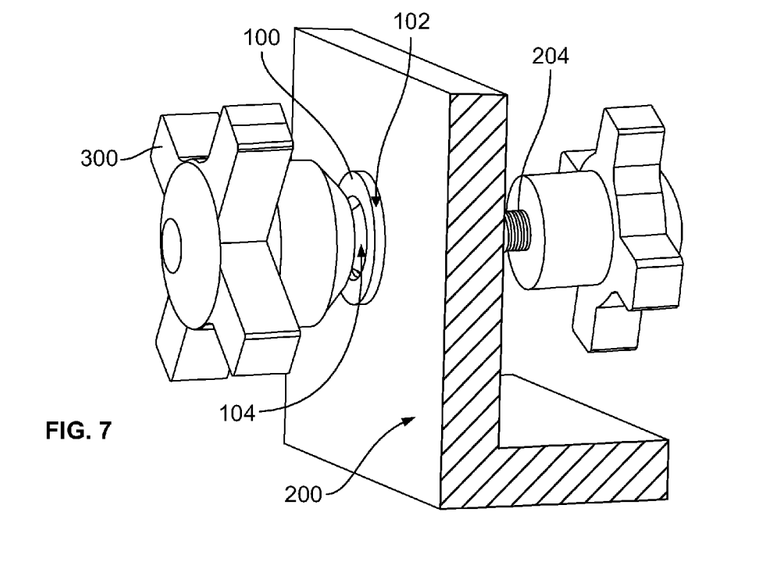
FIG. 7 is a diagrammatic representation of a perspective view of a hand knob secured to a swivel nut assembly that is coupled to a component, according to an embodiment of the present disclosure.

FIG. 7 is a diagrammatic representation of a perspective view of a hand knob 300 secured to the swivel nut assembly 100 that is coupled to the component 200, according to an embodiment of the present disclosure. Referring to FIGS. 1-7, an outer surface of the flange 114 of the swivel connector 104 may include threads that are configured to threadably engage internal threads of the hand knob 300, in order to threadably couple the hand knob 300 to the swivel connector 104. Optionally, the outer surface of the flange 114 may be configured to be securely engaged by other tools. For example, the outer surface of the flange 114 may be hex-shaped in order to be engaged by a hex wrench.

As explained above, embodiments of the present disclosure provide systems, methods, and assemblies of efficiently securing two components having different shapes together. The swivel nut assembly 100 is configured to accommodate angular differences between the two components. The swivel nut assembly 100 includes the socket nut 102 and the swivel connector 104, which is rotationally captured by the socket nut 102. The swivel connector 104 remains secured to the socket nut 102 and both are not (or are less) susceptible to being misplaced in relation to the other (as compared to prior known washer assemblies). Embodiments of the present disclosure provide systems, methods, and assemblies of preventing, minimizing, or reducing the possibility of loose parts being lost within a structure, system, or the like that is being manufactured.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope.

While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A swivel nut assembly configured to adaptively secure a first component to a second component, the swivel nut assembly comprising:
    a socket nut comprising a first portion having a first internal threading, a second portion defining a swivel chamber, and an opening at a terminal end, wherein the opening connects to the swivel chamber; and
    a swivel connector comprising a ball having a first external threading, wherein the swivel connector is moved into the swivel chamber via the first external threading threadably engaging the first internal threading to move the ball into the swivel chamber, wherein the ball is rotationally captured within the swivel chamber after the ball is moved into the swivel chamber, wherein the swivel connector includes at least one internal wall that defines a central passage, wherein the internal wall is configured to threadably engage a fastener that passes into the central passage when the opening is aligned with the central passage.

2. The swivel nut assembly of claim 1, wherein the first portion comprises an annular collar, and wherein the second portion comprises a retaining sleeve.

3. The swivel nut assembly of claim 2, wherein the retaining sleeve comprises the opening at the terminal end, wherein the opening has a first diameter, wherein the ball has a second diameter, wherein the first diameter is less than the second diameter.

4. The swivel nut assembly of claim 2, wherein the retaining sleeve comprises a second external threading that is configured to threadably couple to one or both of the first component or the second component.

5. The swivel nut assembly of claim 1, wherein the swivel connector further comprises a flange connected to the ball through a stem.

6. The swivel nut assembly of claim 5, wherein the flange is configured to threadably engage a hand knob.

7. The swivel nut assembly of claim 1, wherein the swivel connector is prevented from disconnecting from the socket nut until the swivel connector and the socket nut are axially aligned and the swivel connector is rotated relative to the socket nut in a disconnecting direction.

8. The swivel nut assembly of claim 1, wherein the swivel chamber is defined by a smooth, semi-spherical interior surface.

9. A component connection system comprising:
a first component defining a first passage;
a second component defining a second passage that connects to the first passage; and
a swivel nut assembly comprising:
a socket nut comprising a first portion having a first internal threading, a second portion defining a swivel chamber, and an opening at a terminal end, wherein the opening connects to the swivel chamber, wherein the second portion is positioned within the first passage; and
a swivel connector comprising a ball having a first external threading, wherein the swivel connector is moved into the swivel chamber via the first external threading threadably engaging the first internal threading to move the ball into the swivel chamber, wherein the ball is rotationally captured within the swivel chamber after the ball is moved into the swivel chamber, wherein the swivel connector includes at least one internal wall that defines a central passage, wherein the internal wall is configured to threadably engage a fastener that passes into the central passage when the opening is aligned with the central passage.

10. The component connection system of claim 9, wherein the first passage is angled with respect to the second passage such that the first passage is not coaxial with the second passage.

11. The component connection system of claim 9, wherein the first portion comprises an annular collar, and wherein the second portion comprises a retaining sleeve.

12. The component connection system of claim 11, wherein the retaining sleeve comprises the opening at the terminal end, wherein the opening has a first diameter, wherein the ball has a second diameter, wherein the first diameter is less than the second diameter.

13. The component connection system of claim 11 wherein the retaining sleeve comprises a second external threading that threadably couples to the first component within the first passage.

14. The component connection system of claim 9, wherein the swivel connector further comprises a flange connected to the ball through a stem.

15. The component connection system of claim 14, wherein the flange is configured to threadably engage a hand knob.

16. The component connection system of claim 9, wherein the swivel connector is prevented from disconnecting from the socket nut until the swivel connector and the socket nut are axially aligned and the swivel connector is rotated relative to the socket nut in a disconnecting direction.

17. The component connection system of claim 9, wherein the swivel chamber is defined by a smooth, semi-spherical interior surface.

18. A swivel nut assembly configured to adaptively secure a first component to a second component, the swivel nut assembly comprising:
a socket nut comprising an annular collar having a first internal threading, and a retaining sleeve having a smooth, semi-spherical interior surface defining a swivel chamber, wherein the retaining sleeve comprises an opening having a first diameter at a terminal end, wherein the opening has a first diameter; and
a swivel connector comprising a ball having a first external threading, a flange connected to the ball through a stem, and a central passage through the swivel connector, wherein the central passage is configured to threadably receive and engage a fastener, wherein the ball has a second diameter that is greater than the first diameter, wherein the swivel connector is moved into the swivel chamber via the first external threading threadably engaging the first internal threading to move the ball into the swivel chamber, wherein the ball is rotationally captured within the swivel chamber after the ball is moved into the swivel chamber, and wherein the swivel connector is prevented from disconnecting from the socket nut until the swivel connector and the socket nut are axially aligned and the swivel connector is rotated relative to the socket nut in a disconnecting direction.

19. A method of adaptively securing a first component to a second component, the method comprising:
moving a ball of a swivel connector into a swivel chamber of a socket nut, wherein the moving comprises threadably engaging a first external threading of the swivel connector with a first internal threading of the socket nut;
rotationally capturing the ball within the swivel chamber after the ball is moved into the swivel chamber; and
threadably engaging a fastener with an internal wall of the swivel connector, wherein the threadably engaging the fastener comprises:
aligning an opening at a terminal end of the socket nut that connects to the swivel chamber with a central passage of the swivel connector; and
passing a distal end of the fastener into the central passage that is exposed through the opening.

20. The method of claim 19, further comprising preventing the swivel connector from disconnecting from the socket nut until the swivel connector and the socket nut are axially aligned and the swivel connector is rotated relative to the socket nut in a disconnecting direction.

* * * * *